United States Patent [19]
Himmele et al.

[11] 3,846,497
[45] Nov. 5, 1974

[54] PRODUCTION OF α-NAPHTHOLS
[75] Inventors: Walter Himmele, Walldorf; Werner Aquilla, Ludwigshafen, both of Germany
[73] Assignee: Badische Anilin- & Soda-Fabrik Aktiengesellschaft, Ludwigshafen/Rhine, Germany
[22] Filed: Feb. 17, 1972
[21] Appl. No.: 227,271

[30] Foreign Application Priority Data
Feb. 19, 1971  Germany............................ 2107958

[52] U.S. Cl.............. 260/592, 260/473 F, 260/590, 260/591
[51] Int. Cl............................................ C07c 49/82
[58] Field of Search..................... 260/592

[56] References Cited
UNITED STATES PATENTS
2,589,686   3/1952   Fawaz................................. 260/592
3,605,760   9/1971   Kallianos et al. .................... 260/592

OTHER PUBLICATIONS
Dimodica et al., Chem. Abstracts 51, 6578d, (1957).
Dimodica et al., Chem. Abstracts 51, 13828g (1957).

Primary Examiner—Daniel D. Horwitz
Attorney, Agent, or Firm—Johnston, Keil, Thompson & Shurtleff

[57] ABSTRACT

The production of α-naphthols by reaction of an arylacetaldehyde with β-dicarbonyl compound, and the new α-naphthols themselves which are starting materials for the production of dyes and pesticides.

7 Claims, No Drawings

PRODUCTION OF α-NAPHTHOLS

The invention relates to a process for the production of α-naphthols by reaction of an arylacetaldehyde with a β-dicarbonyl compound.

It is known that 2-cyano-3-phenyl-1-naphthol can be obtained in a yield of 34.7 percent of theory by reaction of deoxybenzoin with ethyl cyanoacetate in the presence of glacial acetic acid and ammonium acetate as catalyst at 180°C. 2-cyano-3-(p-methoxy)-1-naphthol is obtained in a low yield in the reaction of 4-methoxybenzyl phenyl ketone with methyl cyanoacetate at a reaction temperature of 170° to 180°C. Benzyl naphthyl ketone in the same method gives 2-cyano-3-β-naphthyl-α-naphthol in a yield of 40 percent (Chem. Ber., 91, 1706 et seq. (1958). (2-cyclohexylidene-cyanohexylidene)-malonitrile is obtained in a moderate yield from 2-cyclohexylidenecyclohexanone and malonitrile in the presence of glacial acetic acid and ammonium acetate (Chem. Ber., 95, 244 (1962)). A corresponding reaction with ethyl cyanoacetate instead of malonitrile gives a moderate yield of 9-hydroxy-10-cyano-1,2,3,4,5,6,7,8-octahydrophenanthrene. It is known from J. Amer. Chem. Soc., 53, 1170 et seq. (1931) that hydratropaldehyde when reacted with malonic acid in the presence of an amine gives a mixture of γ-methyl-γ-phenylbutenic ester and the corresponding α-carbethoxy compound. Condensation with simultaneous cyclization is not described.

This invention has as an object a new process for producing α-naphthols in better yield and purity.

Another object of this invention is the new α-naphthols.

We have found that α-naphthols of the general formula:

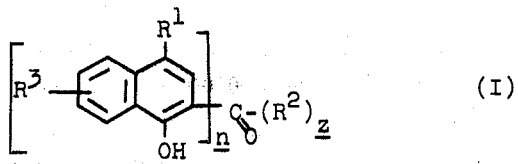

in which $R^1$ and $R^2$ are identical or different aliphatic, araliphatic, cycloaliphatic or aromatic radicals, $R^3$ is hydrogen or a condensed aromatic radical, $n$ and $z$ both are 1, $R^2$ may also be the radical $-OR^4$ in which $R^4$ is an aliphatic radical, $R^1$ and $R^3$ may also together be members of one or two alicyclic rings condensed onto the aryl nucleus bearing $R^3$, or $z$ may be zero if $n$ is 2 are advantageously obtained by reacting an arylacetaldehyde of the general formula:

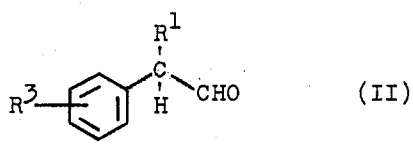

in which $R^1$ and $R^3$ have the meanings given above with a β-dicarbonyl compound of the general formula:

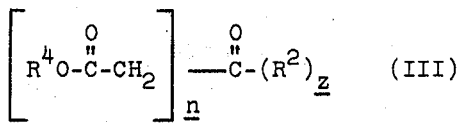

in which $R^2$, $n$, $z$ and $R^4$ have the meanings given above.

When 2-phenylpropanal and methyl acetoacetate are used, the reaction may be represented by the following equation:-

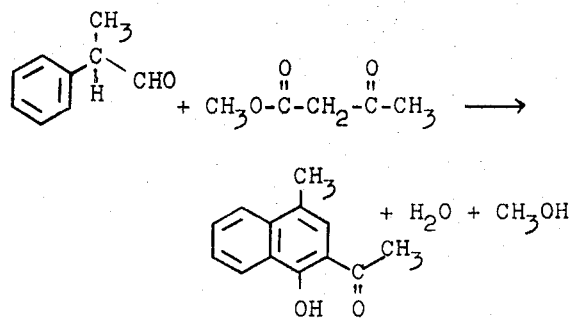

The process according to the invention, as compared with prior art methods, gives the new α-naphthols (I) in better yields and purity. Condensation of the starting materials and cyclization proceed simultaneously without the formation of substantial amounts of by-products. These advantageous results are surprising having regard to the prior art.

The starting materials (II) are reacted with the starting materials (III) in stoichiometric amounts or with an excess of starting material (III), preferably in a ratio of 1 to 2 moles of starting material (III) to each mole of starting material (II). Preferred starting materials (II) and (III) and consequently preferred end products (I) are those in whose formulae $R^1$ and $R^2$ are different or identical and each is alkyl of one to seven carbon atoms, cycloalkyl of five to eight carbon atoms, aralkyl of seven to twelve carbon atoms, phenyl or naphthyl, and $R^3$ is hydrogen or phenyl condensed on particularly in the 3,4-position to the acetaldehyde group, $n$ and $z$ are both 1, and $R^2$ may also be $-O-R^4$ where $R^4$ is alkyl of one to four carbon atoms. In the preferred starting materials and end products $R^1$ and $R^3$ may also be common members of a five-membered or six-membered alicyclic ring condensed on to the phenyl nucleus bearing $R^3$, and $R^1$, $R^3$ and the phenyl nucleus may in particular be members of an indan radical, or $R^1$ and $R^3$ may be common members of two five-membered and/or six-membered rings each of which is condensed on to the phenyl nucleus bearing $R^3$, and $R^1$, $R^3$ and the phenyl nucleus may particularly be members of an acenaphthene radical. In the preferred starting materials, $R^4$ has the meanings given above. $z$ may similarly be zero and $R^2$ may be omitted and thus bis-(α-naphthyl)-ketones may be obtained as end products if $n$ is 2 and thus an ester of the acetonedicarboxylic acid is used as starting material (III). The said radicals and rings may also contain groups which are inert under the reaction conditions, for example alkyl or alkoxy of one to four carbon atoms in each case.

The following arylacetaldehydes may be used as starting materials (II): α-methylphenylacetaldehyde, α-hexylphenylacetaldehyde, α-isopropylphenylacetaldehyde, α-(β-ethoxy)-ethylphenylacetaldehyde, α-ethylphenylacetaldehyde, a-tert.-butylphenylacetaldehyde, α-cyclohexylphenylacetaldehyde, α-benzylphenylacetaldehyde, α-(β'-phenyl)-propylphenylacetaldehyde, α-phenylphenylacetaldehyde and α-naphthylphenylacetaldehyde; corresponding naphthyl-(2)-acetaldehydes bearing substituents in the α-position; 1-formylindan, 1-formylindene-(2,3), 1-formylnaphthalene, 1-formyltetrahydronaphthalene, 5-formyl-7H-benzocycloheptane, 1-formyl-3-methylindan, 1-formyl-4-ethylnaphthalene; 1-formylacenaphthene, 1-formylphenalene and 3-formylphenalene.

The following β-dicarbonyl compounds are suitable as starting materials (III): the dimethyl, diethyl and dibutyl esters of malonic acid; the dimethyl, dipropyl, diisopropyl, diisobutyl and monomethylmonoethyl esters of malonic acid; corresponding esters of acetoacetic acid, γ-ethoxyacetoacetic acid, β-oxovaleric acid, β-oxocaproic acid, β-oxocaprylic acid, β-oxocyclohexanylpropionic acid, β-oxo-γ-phenylbutyric acid or β-oxo-β-phenylpropionic acid; and analogous diesters of acetonedicarboxylic acid.

The reaction is advantageously carried out in the presence of a primary, secondary or tertiary amine together with a carboxylic acid as catalyst. Instead of a catalyst consisting of two components, salts or carboxamides obtained from such amines and carboxylic acids may be used advantageously as catalysts. It is convenient to use amounts of from 0.01 to 0.1 mole of amine to 1 mole of carboxylic acid, and from 0.01 to 0.1 mole of amine or 0.05 to 0.2 mole of carboxamide or 0.01 to 0.1 mole of amine salt of the carboxylic acid per mole of starting material (II). Examples of suitable catalysts are amines such as propylamine, tert.-butylamine, aniline, trimethylamine, n-butylamine, quinoline, picolines, morpholine, dimethylamine, triethylamine, diethylamine, diisopropylamine, pyridine, N-ethylaniline, N,N-diethylaniline, N-ethylpiperidine, N-methylpyrrolidine, piperidine, pyrrole, pyrroline, pyrrolidine, N-methylaniline, benzylamine, cyclohexylamine, ditert.-butylamine, piperazine, or N-methylpiperazine together with an aromatic, araliphatic, cycloaliphatic or preferably aliphatic polycarboxylic, dicarboxylic or particularly monocarboxylic acid such as formic acid, acetic acid, propionic acid, butyric acid, cyclohexanoic acid, benzoic acid, m-toluic acid, p-toluic acid, p-nitrobenzoic acid, isovaleric acid, oxalic acid, glutaric acid, adipic acid, β-chloropropionic acid, phenylpropionic acid, stearic acid or chloroacetic acid; salts or carboxamides obtained from amine and carboxylic acid; or appropriate mixtures. If desired an inorganic acid such as hydrochloric acid or phosphoric acid may also be used together with an amine, advantageously together with one of the said amines in an amount of 0.5 to 3.0 moles of amine per mole of inorganic acid.

The reaction is carried out as a rule at a temperature of from −15° to +250°C, preferably at from 50° to 160°C, at atmospheric or superatmospheric pressure, continuously or batchwise. Organic solvents which are inert under the reaction conditions, such as alkanols, for example methanol or 2-ethylhexanol; or ethers such as di-n-butyl ether may be used if desired. In some cases it is advantageous to control the temperature during the reaction by means of a solvent as entrainer or by azeotropic removal of the water and alcohol formed during the reaction and separating the same. For example cyclohexane, n-hexane or heptane may be used as entrainer. This separation of the two byproducts of the reaction is not necessary but in many cases it is convenient for the achievement of an optimum yield. Amounts of from 5 to 50 percent by weight of solvent, based on starting material (II), are generally used.

The reaction may be carred out as follows: a mixture of starting materials, advantageously with the catalyst and an organic solvent, is kept at the reaction temperature over six to eighteen hours. The components of the starting mixture may be added in any sequence. The temperature is advantageously raised during the reaction within the said temperature interval, or more advantageously the reaction may be carried out in a first temperature stage over 2 to 4 hours at a temperature of from 90° to 110°C and then for the remainder of the time at from 140° to 160°C. Water and if desired the alcohol formed are advantageously removed during the reaction. Separation of the reaction byproducts (which can easily be separated completely by distillation, for example alkanols having one to four carbon atoms) may also be carried out by continuous fractionation of the reaction mixture during the reaction. It is possible in this way to follow the course of the reaction and to regulate the temperature in the reactor so that the reaction proceeds at the desired speed.

The mixture is then cooled and the end product is separated therefrom by a conventional method, for example by distillation or by crystallization, filtration and recrystallization from a lower alkanol such as methanol, ethanol or isobutanol or from an alkanoic acid such as acetic acid. Esters such as ethyl acetate or butyl acetate, or ethers, for example tetrahydrofuran, and also aromatic and cycloaliphatic hydrocarbons such as benzene and cyclohexane are also suitable for the recrystallization. By repeatedly removing the filtrate with the entrainer at the abovementioned end temperature of the reaction and working up the mixture in the said manner, further amounts of crystallized end product can be obtained. In the case of naphthols (I) which bear an ester group in the β-position, the corresponding carboxylic acid may be obtained by hydrolysis by a conventional method, for example by heating with aqueous caustic potash solution.

The new compounds which can be prepared by the process of the invention are valuable starting materials for the production of dyes and pesticides. Thus by reacting them with diamines, for example with ethylene diamine or o-phenylene diamine, bisazomethines may be obtained which can be converted with metal salts into bright pigments having high color strength. Moreover the carboxamides of 4-alkyl-1-naphthol-2-carboxylic acids obtainable from the esters may be used as light-sensitive substances in color photography (Japanese application No. 7,006,993). Furthermore the anilides of the said 1-naphthol-2-carboxylic acids may be used as plant protection agents, particularly as fungicides.

The following Examples illustrate the invention. The parts specified in the Examples are parts by weight. Parts by weight bear the same relation to parts by volume as the kilogram to the liter.

EXAMPLE 1

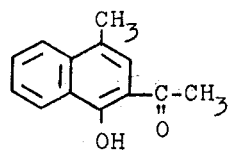

570 parts of methyl acetoacetate and 603 parts of 2-phenylpropanal are placed in a stirred vessel fitted with an entrainment attachment. 18 parts of acetic acid and 13 parts of piperidine are added as a catalyst at 22°C while stirring. To make it possible to remove water formed during the reaction, 100 parts by volume of cyclohexane is added to the reaction mixture. 91 parts of water and organic solvent is removed over 90 minutes at a temperature of 90° to 110°C. It consists of 70.6 percent by weight of water and 28 percent by weight of methanol. 56 parts of water and organic solvent (consisting of 13 percent by weight of water and 87 percent by weight of methanol) is removed over 3 hours by raising the temperature to 142°C. Over another 4 hours, another 76 parts of water and organic solvent (13.6 percent by weight of water and 86.4 percent by weight of methanol) may be obtained. The reaction mixture is then cooled and allowed to stand for 12 hours, 346 parts of crude end product thus crystallizing out. 100 parts of water and organic solvent is removed out of the 655 parts of filtrate with 50 parts of cyclohexane over 4½ hours. The temperature is from 148° to 160°C. After repeating the same separation process, 533 parts of crude end product can be obtained.

By recrystallization from glacial acetic acid, 588 parts of pure 2-acetyl-4-methyl-1-naphthol is obtained having a melting point of 121°C. The yield is 65.6 percent of theory based on 2-phenylpropanal.

EXAMPLE 2

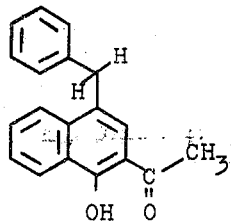

210 parts of 2,3-diphenylpropanal is reacted with 140 parts of methyl acetoacetate in an entrainment apparatus as described in Example 1. The entrainer is n-hexane. 22 parts of propionic acid and 14 parts of pyridine are used as the catalyst.

51 parts of entrained water and organic solvent are isolated in the course of 14 hours. The reaction temperature is kept at 90° to 105°C in the first 6 hours. 23 parts with a content of 76 percent of water is obtained. 28 parts is entrained out by raising the reaction temperature from 105° to 145° to 170°C. The reaction mixture discolors and becomes blue black. After distilling off the entrainer and distilling the reaction mixture (14 parts of distillate) at 20 mm up to a temperature of 228°C, 150 parts of glacial acetic acid is added.

208 parts (78 percent of theory based on 2,3-diphenylpropanal) of crystallized blue-green 4-benzyl-2-acetyl-1-naphthol is obtained having a melting point of 116°C after crystallization from glacial acetic acid.

EXAMPLE 3

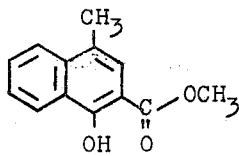

As described in Example 1, 402 parts of 2-phenylpropanal and 396 parts of dimethyl malonate are heated at 148° to 155°C for 10 hours. The amount of entrainer is 250 parts by volume. 82 parts of entrained water and organic solvent is obtained with a water content of 71 percent by weight.

In a fractional distillation of the mixture at a pressure of 27 mm 74 parts is obtained up to a distillation temperature of 190°C. This consists mainly of dimethyl malonate. Up to a temperature of 200°C 130 parts distil over and this crystallizes out partly. A fraction (262 parts) which crystallizes out completely passes over up to 210°C. Another 65 parts can be obtained up to 224°C. After recrystallization from glacial acetic acid 222 parts of 4-methyl-2-carboxylic methyl ester-1-naphthol is obtained having a melting point of 104°C. This is equivalent to a yield of 66.5 percent of theory with reference to 2-phenylpropanal.

EXAMPLE 4

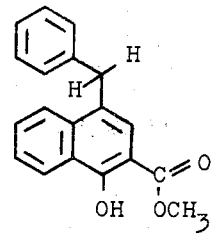

332 parts of 2,3-diphenylpropanal is heated in a stirred vessel with 238 parts of dimethyl malonate, 18 parts of acetic acid, 13 parts of piperidine and 100 parts of cyclohexane at 105°C. The water formed is entrained out with the entrainer. 23 parts of a condensate containing 85 percent by weight of water is obtained during 6 hours at 105°C. Some of the cyclohexane is then similarly distilled off so that the reaction temperature rises to 145°C. In the course of another 8 hours, a total of 36 parts is obtained consisting of 11 percent by weight of water and 85 percent by weight of methanol. Upon standing overnight, the crude end product crystallizes out. 367 parts of 4-benzyl-1-naphthol-2-carboxylic methyl ester is obtained having a melting point of 101°C after recrystallization from ethanol.

EXAMPLE 5

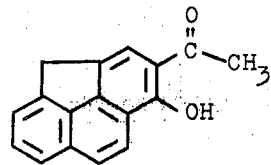

192 parts of 1-formylacenaphthene is reacted with 138 parts of methyl acetoacetate in the presence of 150 parts by volume of n-heptane, 13 parts of propionic acid and 5 parts of piperidine. 34 parts of water and organic solvent having a water content of 34.4 percent by weight is entrained out in the course of 6 hours. Another 17 parts having a water content of 26.8 percent by weight is entrained out over another 8 hours.

13 parts passes over in the distillation of the reaction mixture in vacuo at a pressure of 0.5 mm in the range up to 195°C. Up to a boiling point of 235°C 165 parts passes over (residue 45 parts). 138 parts of 1,8-benzoacenaphthene-4-acetyl-5-ol is obtained having a

EXAMPLE 6

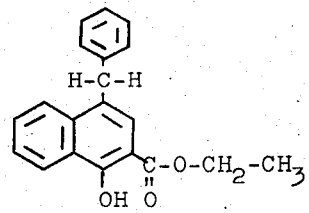

332 parts of 2,3-diphenylpropanal is reacted with 288 parts of diethyl malonate in the presence of 15 parts of pyrrolidine and 10 parts of glacial acetic acid as described in Example 4. Hexane is used as entrainer. The following are obtained from 520 parts of reaction mixture by fractional distillation at a pressure of 0.5 mm:

27 parts (distillation temperature up to 218°C)
320 parts (distillation temperature up to 230°C)
40 parts (distillation temperature up to 250°C) and 31 parts of residue.

376 parts (78.3 percent of theory) of the ethyl ester of 4-benzyl-1-naphthol-2-carboxylic acid is obtained with a melting point of 88°C after having been recrystallized from ethanol.

EXAMPLE 7

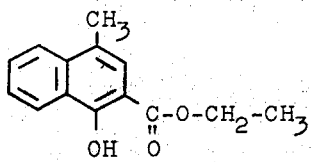

278 parts of 2-phenylpropanal is reacted with 480 parts of diethyl malonate as described in Example 6. 18 parts of acetic acid and 13 parts of pyridine are used as catalyst. Heptane serves as entrainer. 31 parts of water of reaction are obtained. 151 parts (more than 80 percent by weight of diethyl malonate) can be distilled off at a pressure of 30 mm up to a distillation temperature of 120°C. 310 parts of the ethyl ester of 4-methyl-1-naphthol-2-carboxylic acid is obtained having a boiling point of 153°C at 0.5 mm.

EXAMPLE 8

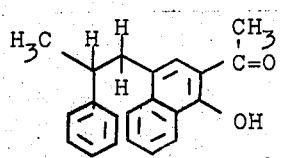

238 parts of 2,4-diphenylpentanal-1 and 140 parts of methyl acetoacetate are reacted as described in Example 2. The catalyst is a mixture of 18 parts of glacial acetic acid and 12 parts of piperidine. The entrainer is cyclohexane.

Over 6 hours 64 parts of condensate is obtained which consists to the extent of 40 percent by weight of water. The reaction temperature is from 93° to 110°C. In the second phase of the reaction the temperature is adjusted to 145°C by separating cyclohexane. 16 parts of condensate is obtained consisting to the extent of more than 90 percent by weight of methanol. The reaction mixture is fractionated at a pressure of 1.5 mm. 190 parts of 4-(2-phenylpropyl-1)-2-acetyl-1-naphthol is obtained having a boiling point of 230°C at 1.5 mm.

EXAMPLE 9

192 parts of ethyl benzoylacetate is reacted with 146 parts of 1-formylindan as described in Example 1. 15 parts of N-methylpyrrolidone-2 together with 15 parts of glacial acetic acid are used as catalyst. The entrainer is cyclohexane. 18 parts of water is entrained out at a reaction temperature of 100°C over 4 hours. 50 parts of volume of ethanol and entrainer are entrained out in the course of sixteen hours.

96 parts are obtained up to a distillation temperature of 165°C by fractionation of the reaction mixture at a pressure of 0.5 mm. An orange oil passes over at from 185° to 230°C and this crystallizes when it is stirred with ethanol.

74 parts of 4-benzoylacenaphthene-5-ol is obtained having a melting point of 106°C.

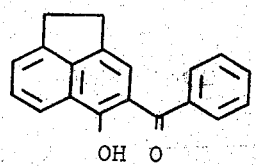

EXAMPLE 10

292 parts of 1-formylindan is reacted with 330 parts of dimethyl malonate as described in Example 1. 18 parts of glacial acetic acid and 13 parts of piperidine is used as catalyst. The entrainer is cyclohexane. 97 parts of a mixture of water and methanol is separated over 14 hours.

Fractionation of the reaction mixture gives three fractions:

(1) from 66° to 165°C at 0.5 mm: 56 parts
(2) from 165° to 190°C at 0.5 mm: 187 parts
(3) from 190° to 192°C at 0.5 mm: 158 parts and
residue 40 parts.

Fraction (2) is recrystallized from methanol. 42 parts of the methyl ester of 5-acenaphthenol-4-carboxylic acid having a melting point of 139°C after recrystallization from ethanol is obtained:

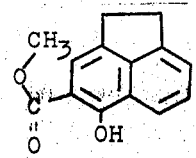

We claim:

1. A process for the production of α-naphthols of the formula:

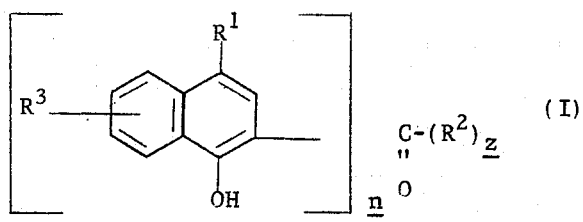

in which R¹ and R² are identical or different alkyls of one to seven carbon atoms, R³ is hydrogen or a condensed aromatic hydrocarbon radical, $n$ and $z$ are both 1, or R¹ and R³ are common members of one or two five or six membered cycloaliphatic or aromatic hydrocarbon rings which in each case are condensed on to the aryl nucleus bearing R³ wherein an arylacetaldehyde of the formula

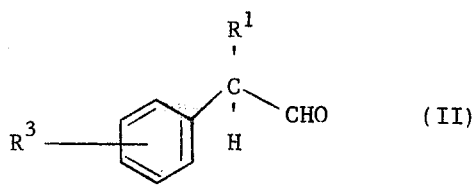

in which R¹ and R³ have the meanings given above is reacted in the presence of a catalyst selected from the group consisting of amine and a carboxylic acid, an amine and an inorganic acid selected from the group consisting of hydrochloric acid and phosphoric acid and salts or carboxamides of said amines and carboxylic acids, with a β-dicarbonyl compound of the formula:

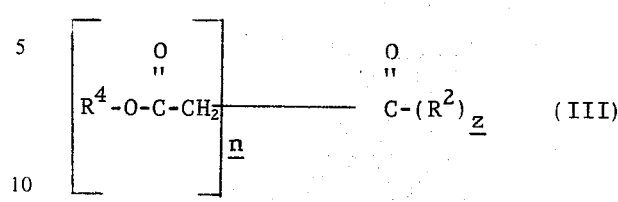

in which R², $n$, and $z$ have the meanings given above, and R⁴ is an alkyl of one to four carbon atoms.

2. A process as claimed in claim 1 carried out with 1 to 2 moles of starting material (III) for each mole of starting material (II).

3. A process as claimed in claim 1 carried out in the presence of a primary, secondary or tertiary amine together with a carboxylic acid or a salt or carboxamide obtained from such an amine and carboxylic acid as the catalyst.

4. A process as claimed in claim 1 carried out with 0.01 to 0.1 mole of amine (based on 1 mole of carboxylic acid) and 0.01 to 0.1 mole of amine or 0.05 to 0.2 mole of carboxamide or 0.01 to 0.1 mole of amine salt of the carboxylic acid per mole of starting material (II).

5. A process as claimed in claim 1 carried out at a temperature of from 15° to 250°C.

6. A process as claimed in claim 1 carried out at a temperature of from 50° to 160°C.

7. A process as claimed in claim 1 carried out in the presence of an organic solvent which is inert under the reaction conditions.

* * * * *